US008141062B2

(12) United States Patent
Baev et al.

(10) Patent No.: US 8,141,062 B2
(45) Date of Patent: Mar. 20, 2012

(54) REPLACING A VARIABLE IN A USE OF THE VARIABLE WITH A VARIANT OF THE VARIABLE

(75) Inventors: Ivan D. Baev, Cupertino, CA (US); David H. Gross, Campbell, CA (US); Richard E. Hank, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1426 days.

(21) Appl. No.: 11/701,290

(22) Filed: Jan. 31, 2007

(65) Prior Publication Data
US 2008/0184215 A1 Jul. 31, 2008

(51) Int. Cl.
 *G06F 9/45* (2006.01)
(52) U.S. Cl. ............... 717/152; 717/155; 717/156
(58) Field of Classification Search .................. None
 See application file for complete search history.

(56) References Cited

U.S. PATENT DOCUMENTS

| 6,090,156 A * | 7/2000 | MacLeod ............ 717/157 |
| 7,228,528 B2 * | 6/2007 | Wang et al. .......... 717/131 |
| 2003/0237080 A1 * | 12/2003 | Thompson et al. ...... 717/161 |

OTHER PUBLICATIONS

Briggs et al. "Rematerialization" Proceedings of the ACM SIGPLAN 1992 conference on Programming Language Design and Implementation, 1992.*
Baev et al. "Prematerialization: reducing register pressure for free", Proceedings fo the 15th international conference on Parallel architectures and compilation techniques, 2006.*
Lo et al. "Aggregate Operation Movement: A Min-Cut Approach to Global Code motion", Proceedings of the Second International Euro-Par Conference on Parallel Processing—vol. II, 1996.*
David A. Berson, Rajiv Gupta, and Mary Lou Soffa, Presented at IFIP WG 10.3(Concurrent Systems) Working Conference on Architectures and Compliation Techniques for Fine and Medium Grain Parallelism, Orlando, FL., Jan. 1993, URSA: A Unified ReSource Allocator for Registers and Functional Units in VLIW Architectures (12 pages).
Briggs et al., Register Allocation via Graph Coloring, Apr. 1992 (154 pages).
Briggs et al., Rematerialization, 1992 (11 pages).
Briggs, et al., Improvements to Graph Coloring Register Allocation, ACM Transactions on Programming Languages and Systems, vol. 16, No. 3, May 1994 (26 pages).
Chaitin, Register Allocation and Spilling via Graph Coloring, ACM SIGPLAN, 2003 (9 pages).
Govindarajan et al., Minimum Register Instruction Sequencing to Reduce Register Spills in Out-of-Order Issue Superscalar Architectures, IEEE, vol. 52, No. 1, Jan. 2003 (17 pages).
Gupta et al., Register Pressure Sensitivity Redundancy Elimination, 1999 (16 pages).

(Continued)

*Primary Examiner* — Jason Mitchell

(57) ABSTRACT

A method for optimizing a code section prior to performing register allocation for variables referenced in the plurality of computer instructions. The method includes performing at least one of a full prematerialization or a partial prematerialization for a variable in the plurality of computer instructions. The full prematerialization replaces the variable in every use of the variable in the plurality of computer instructions with one or more variants of the variable and replaces a definition of the variable with a nop instruction. The partial prematerialization replaces some but not all occurrences of the variable in uses of the variable in the plurality of computer instructions with one or more variants of the variable without replacing the definition of the variable with the nop instruction.

18 Claims, 12 Drawing Sheets

OTHER PUBLICATIONS

Haga et al., Reducing Code Size in VLIW Instruction Scheduling, 2005 (30 pages).
Hank, Region-Based Compilation, 1996 (179 pages).
Hoflehner et al., Compiler Optimizations for Transaction Processing Workloads on Itanium Linux Systems, IEEE, 2004 (10 pages).
Lowney et al., The Multiflow Trace Scheduling Compiler, Oct. 30, 1992 (83 pages).
Settle et al., Optimization for the Intel Itanium Architecture Register Stack, 2003 (10 pages).
Simpson et al., Value-Driven Redundancy Elimination, Apr. 1996 (150 pages).
Touati, Register Saturation in Superscalar and VLIW Codes, 1998 (16 pages).
Zhao et al., A Model-based Framework: an Approach for Profit-driven Optimization, Mar. 2005 (11 pages).
Baev et al., Prematerialization: Reducing Register Pressure for Free, Sep. 2006 (10 pages).

* cited by examiner

REPLACING A VARIABLE IN A USE OF THE VARIABLE WITH A VARIANT OF THE VARIABLE

BACKGROUND OF THE INVENTION

Although the number of registers has steadily increased with each new generation of processors, complex and more aggressively compiled applications have continually stressed the available register resources. For such applications, the number of overlapping live variable ranges may exceed the number of available physical registers. As the term is employed herein, for example, a live variable range (or the live range of a variable) is defined as the span between two instructions, the definition of the variable and the last use of the variable. The increase in register pressure is a problem arising from too many overlapping live variable ranges for the registers to handle simultaneously.

To facilitate discussion, FIG. 1 shows a simplified schematic to illustrate the concepts of instruction bundles, live variable ranges and register pressure. FIG. 1 shows three separate instruction bundles or very long instruction words (VLIWs) 102, 104 and 106 in a linear sequence. Each instruction bundle has three instructions in the example of FIG. 1. Bundle 102 contains instructions 108, 110 and 112; bundle 104 contains instructions 114, 116 and 118 and bundle 106 contains instructions 120, 122 and 124. After each instruction bundle in this example, there is a processor cycle break (;;) denoted by 103, 105 and 107.

Consider the situation wherein, for example, instruction 108 illustrates the definition of the variable y, instruction 112 illustrates one use of variable y and instruction 116 illustrates the last use of variable y. The live range of variable y 126 may be defined as the subset of the instruction stream that spans from the definition of variabley 108 through one use of variabley at instruction 112 to the last use of variable y 116, as delineated by lines 130 and 134. Similarly, the live range of variable x 128 may be assessed from the definition of variable x at instruction 114 through one use of variable x at instruction 120 to the last use of variable x at instruction 124. The live range of variable x 128 may be defined as the subset of the instruction stream that spans from the definition of variable x 114 to the last use of variable x 124, as delineated by lines 132 and 136.

In the example of FIG. 1, the register pressure may be determined by looking at variables x and y to see how many variables are live at each region of code in the instruction stream. The instruction stream may be divided into three regions delineated by lines 130, 132, 134 and 136, for example. Between lines 130 and 132, the live variable is y and the register pressure is equal to one, i.e., there is only one live variable. Between lines 132 and 134, there are two live variables, x and y; therefore, the register pressure is equal to two. Between lines 134 and 136, the live variable is x; therefore, the register pressure is equal to one. As the term is employed herein, register pressure is measured by the number of simultaneously live variables in a region of code in the instruction stream.

Each of the aforementioned instruction bundles contains a fixed number of instructions. In an instruction stream, a no-operation (nop) instruction may be utilized as a "place-holder" to keep the bundle to a fixed size, e.g., three instructions per bundle. As the term is employed herein, a nop instruction is an instruction that performs no operation except to act as a "place-holder" upon execution.

To facilitate discussion, FIG. 2 shows a simplified schematic to illustrate explicit nop instructions in a VLIW architecture. In the example of FIG. 2, the instruction bundles 202, 204 and 206; the cycle breaks 203, 205 and 207; the instructions 208-224; the live ranges of variable y 226 and variable x 228 as delineated by lines 230-236; and the register pressures are the same as previously described in FIG. 1. Instruction 218, instruction 220, and instruction 222 show explicit nop instructions being used as "place-holders" to keep the instruction bundles 202, 204 and 206 a fixed size. The nop instructions represent resources that may not be utilized efficiently by the processor since nop instructions do not perform any useful operation upon execution.

Alternatively, the instruction bundles, cycle breaks, nop instructions, and the like in an instruction stream may be illustrated by schematics showing the control flow relationship or the dominator relationship. To facilitate discussion, FIGS. 3A and 3B show a control flow graph and a dominator tree, respectively.

FIG. 3A shows a simplified control flow graph, 300. Control flow graph 300 consists of basic blocks 302-314. Block 302 is the root of the graph. Each block consists of a linear sequence of instructions grouped in one or more instruction bundles. The flow of control enters each block at the beginning and exits at the end, i.e., flows through the block. Control flow graph 300 represents a set of blocks and the control flow through each block into that block's successor block(s).

In control flow graph 300, the edges from block 302 represent the flow of control branching from block 302 to either block 304 or block 306, depending upon some run time condition. Each block may have edges to one or more successor blocks or else represents an end of the flow of control illustrated by the graph. Blocks 306, 308 and 314 represent an end of the flow of control, and blocks 302, 304, 310 and 312 show branching in the control flow. Control flow graph 300 represents the control flow of a section of an instruction stream.

FIG. 3B shows the dominator tree corresponding to the control flow graph in FIG. 3A. A block in the control flow graph is considered to dominate a second block in the control flow graph if every flow of control from the root of the control flow graph to the second block must pass through the first block. The dominator relationships are illustrated by a dominator tree. In FIG. 3B the blocks 352-364 are the same as the blocks 302-314 previously described in FIG. 3A; however, the edges in the two figures are different. Dominator tree 350 illustrates the dominator relationships among blocks 352-364. A block is considered to immediately dominate its successor blocks in the dominator tree. Block 352 immediately dominates blocks 354 and 356. Block 354 immediately dominates blocks 358 and 360. Block 360 immediately dominates blocks 362 and 364.

A block is considered to dominate any blocks that it immediately dominates or that its successors in the dominator tree dominate. For example, block 362 is dominated by blocks 352, 354 and 360. Block 360 is the immediate dominator of block 362. Block 354 is the next higher dominator of block 362, and block 352 is the next higher (and the highest) dominator of block 362. Dominator tree 350 represents the dominator relationships among the basic blocks in a section of an instruction stream.

One side effect of the aforementioned complex and aggressively compiled applications in a VLIW architecture may be an increase in register pressure. A typical VLIW architecture is, for example, the Itanium® processor family architecture available from Intel® Corporation of Santa Clara, Calif. One approach in the prior art to relieve register pressure is to perform spill-and-fill operations during register allocation. To facilitate discussion, FIG. 4 shows a simplified schematic to illustrate how a register allocator may solve the high register pressure problem by performing spill-and-fill of a variable to and from memory. FIG. 4 shows instruction bundles and instructions (408, 410, 412, 414, 416, 418, 420, 422, 424) similar to those of FIG. 1 to illustrate the spill-and-fill concept.

Consider the situation wherein, for example, the register allocator may solve a high register pressure problem by storing a variable into memory (spill) when it is defined and loading a variable from memory (fill) when it is used, assuming no register is available to allocate the variable. Thereby, the spilling and filling of registers to and from memory simulates an infinite number of registers available to allocate variables.

For example, the register allocator may solve the problem of high register pressure by looking at the definition of x and inserting a spill instruction 402, which stores the variable x into memory immediately after the definition of x, instruction 414. Immediately before each use of x, the register allocator may insert a fill of variable x, which is a load of variable x from the same memory location that variable x has been stored to in spill instruction 402. With reference to FIG. 4, immediately before the use of x at instruction 420, the register allocator may insert a fill instruction 404 to insert a definition of x from memory. Similarly, the register allocator may insert a fill instruction 406 to insert a definition of x immediately before the use of x (424).

Although the compiler reduces the register pressure during register allocation of variables to available registers by performing the spill-and-fill operations, the spill-and-fill operations may create several performance problems. The problems may be new memory operations, more instructions, and more instruction bundles than before the insertion of spill-and-fill instructions. Also, the fill instructions may not get shared, i.e., there is one fill for each use, not one fill for multiple uses.

Another approach in the prior art to relieve register pressure is the rematerialization of a definition during register allocation. To facilitate discussion, FIG. 5 shows a simplified schematic of instructions 508, 510, 512, 514, 516, 518, 520, 522, and 524 to illustrate the concept of rematerialization. Rematerialization is a technique to break up live ranges of variables by introducing one or more definition(s) close to the uses. Instead of performing the spill-and-fill operations, the compiler may decide that the definition of a variable is suitable to insert a definition of the variable prior to each use.

Consider the situation wherein, for example, the compiler may examine the original definition of x (514) to determine if the definition is suitable. In relation to FIG. 4, the compiler may not perform the spill of x (402) into memory immediately after definition of x (514) or fill of x at instruction (404) or instruction (406) prior to the use of x (520) and use of x (524), respectively. Instead of the spill-and-fill operations, the register allocator may insert a new definition of variable x (504) immediately prior to the use of x (520) and a new definition of variable x (506) immediately prior to the use of x (524). The original definition of variable x (514) is removed.

There is no equivalent spill of x (402) as shown in FIG. 4 in the implementation of FIG. 5. Rematerialization may happen within the spill part of the register allocator loop. Since memory operations tend to be more expensive than redefinitions, the register allocator may choose to perform rematerialization instead of spill-and-fill operations.

Rematerialization may have been able to reduce memory operations compared to spill-and-fill. However, like spill-and-fill, rematerialization generates new instructions to be inserted before each use, longer sequences of instructions that may need to be reorganized to fit into instruction bundles, and possibly more bundles. Furthermore, rematerialization may not be possible for all definitions. Consequently, register pressure may be reduced during register allocation of variables to available registers but at the cost of increasing the number of instructions.

SUMMARY OF INVENTION

The invention relates, in an embodiment, to a method for optimizing a code section that includes a plurality of computer instructions organized as a plurality of instructions. The optimizing is performed prior to performing register allocation for variables referenced in the plurality of computer instructions. The method includes ascertaining a definition of a variable in a first instruction of the plurality of instructions. The method also includes ascertaining a first use of the variable in a second instruction of the plurality of instructions, the first instruction dominating the second instruction in the plurality of instructions. The method additionally includes replacing a first nop instruction in a third instruction of the plurality of instructions with a definition of a first variant of the variable, the definition of the first variant of the variable and the definition of the variable are identical, the third instruction dominates the second instruction in the plurality of computer instructions, the first instruction dominates the third instruction in the plurality of computer instructions. The method additionally includes replacing, in the second instruction, the variable in the first use of the variable with the first variant of the variable.

In another embodiment, the invention relates to a method for optimizing a code section that includes a plurality of computer instructions organized as a plurality of instructions. The method includes performing at least one of a full prematerialization and a partial prematerialization for a variable referenced in the plurality of computer instructions. The full prematerialization replaces the variable in every use of the variable in the plurality of computer instructions with one or more variants of the variable and replaces a definition of the variable with a nop instruction. The partial prematerialization replaces some but not all occurrences of the variable in uses of the variable in the plurality of computer instructions with one or more variants of the variable without replacing the definition of the variable with a nop instruction, wherein the performing the at least one of the full prematerialization and the partial prematerialization is performed prior to performing register allocation for variables referenced in the plurality of computer instructions The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 6A:
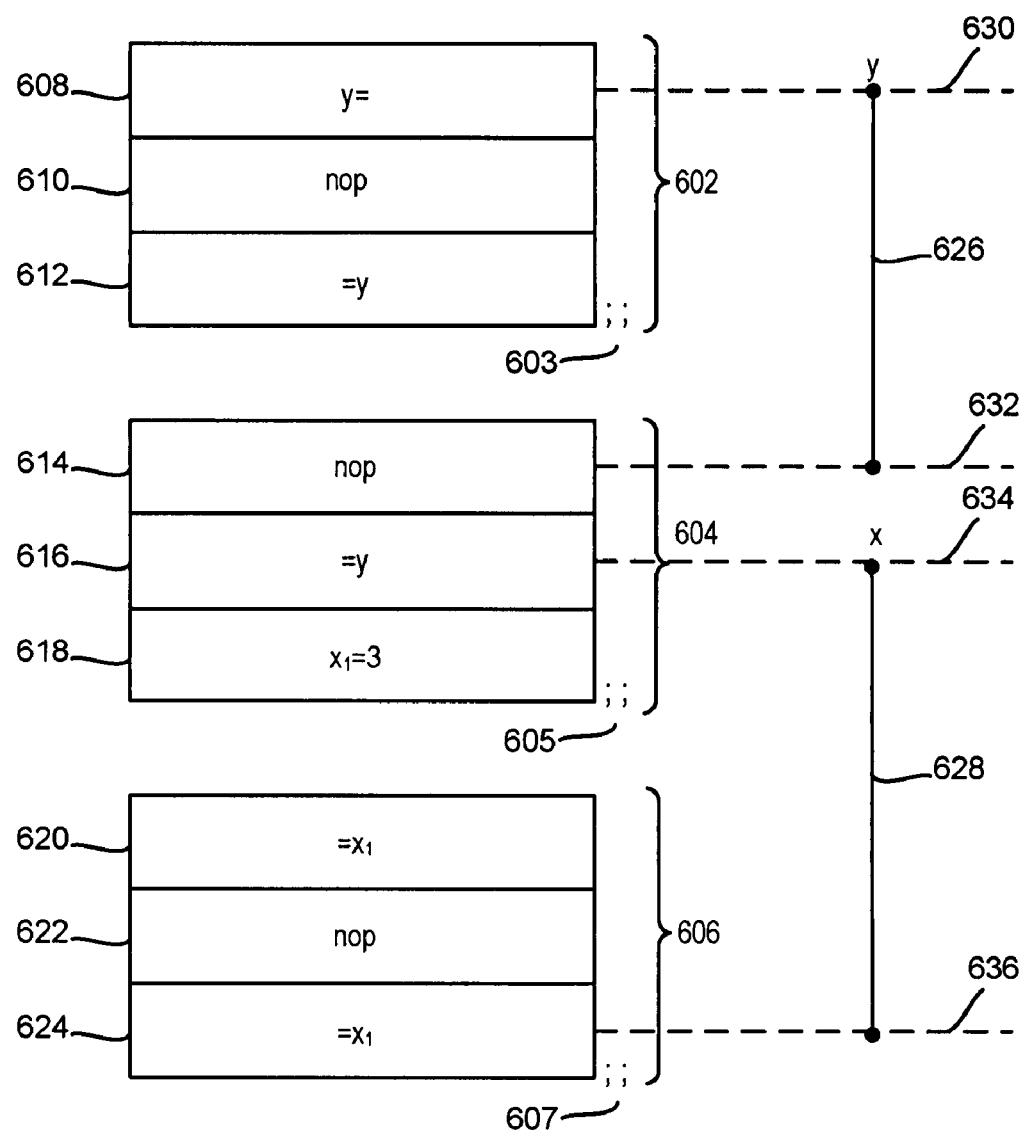
FIG. 6A shows, in accordance with an embodiment of the present invention, a simplified schematic to illustrate the result of prematerialization (PM), an optimization that advantageously takes place prior to register allocation.

The features and advantages of the invention will now be discussed with reference to the enclosed figures. FIG. 6A shows, in accordance with an embodiment of the present invention, a simplified schematic to illustrate the result of prematerialization (PM), an optimization that advantageously takes place prior to register allocation. In the implementation of FIG. 6A, the instruction bundles 602, 604 and 606; the cycle breaks 603, 605 and 607; the instructions 608-624; and the live ranges of variable y 626 and variable x 628 as delineated by lines 630-636 are illustrated.

Figure 1:
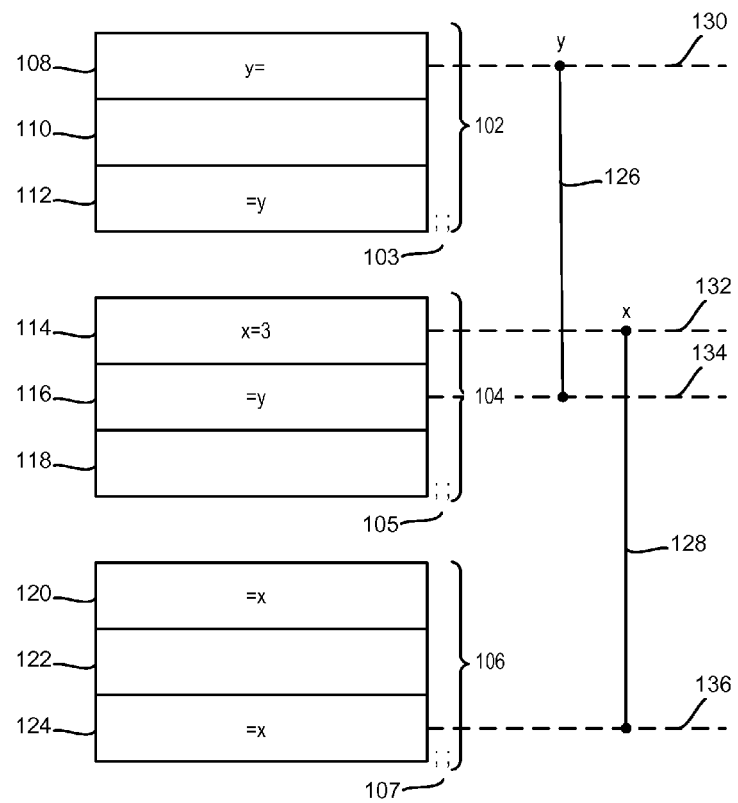
FIG. 1 shows a simplified schematic to illustrate the concepts of instruction bundles, live variable ranges and register pressure.
Figure 2:
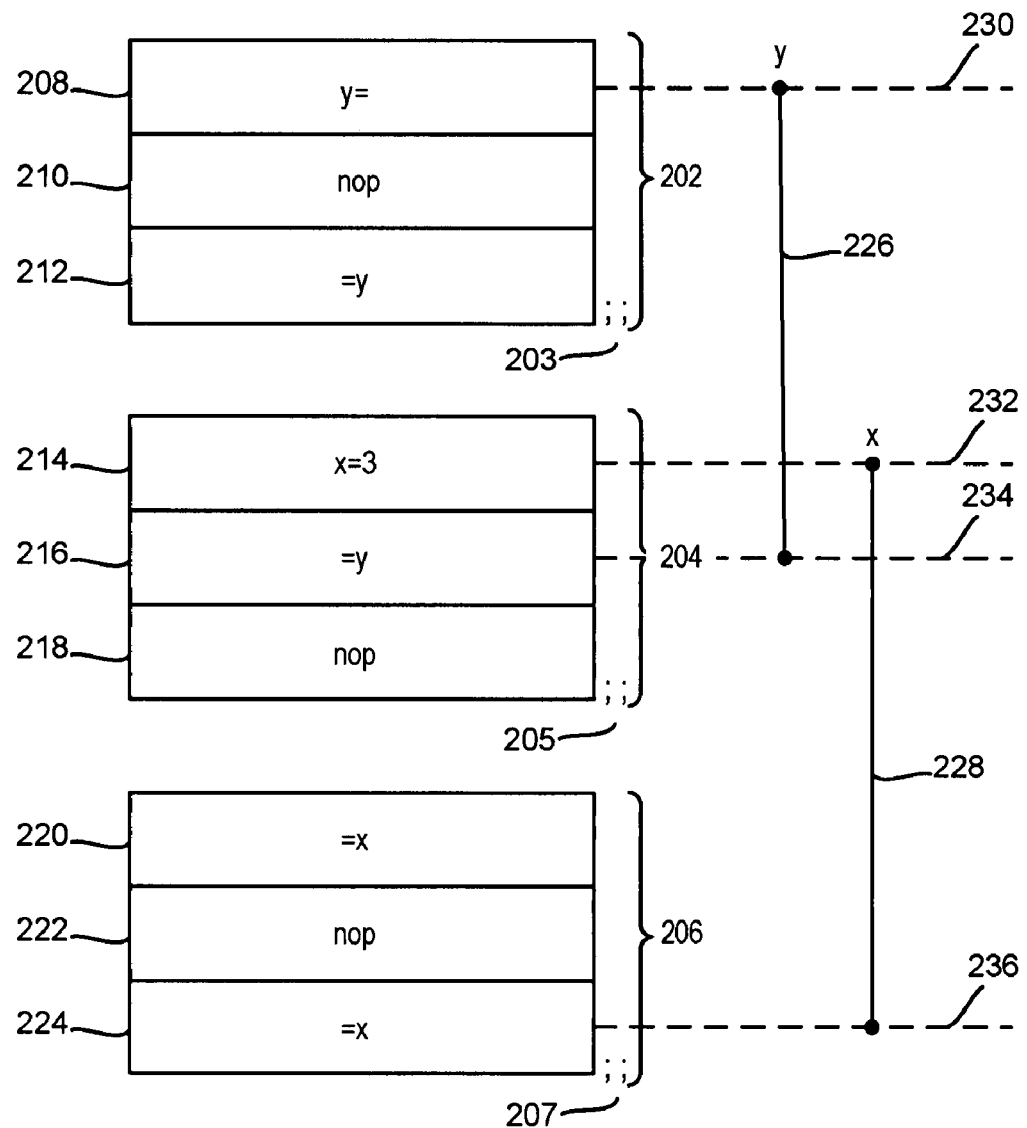
FIG. 2 shows a simplified schematic to illustrate explicit nop instructions in a VLIW architecture.
Figure 3A:
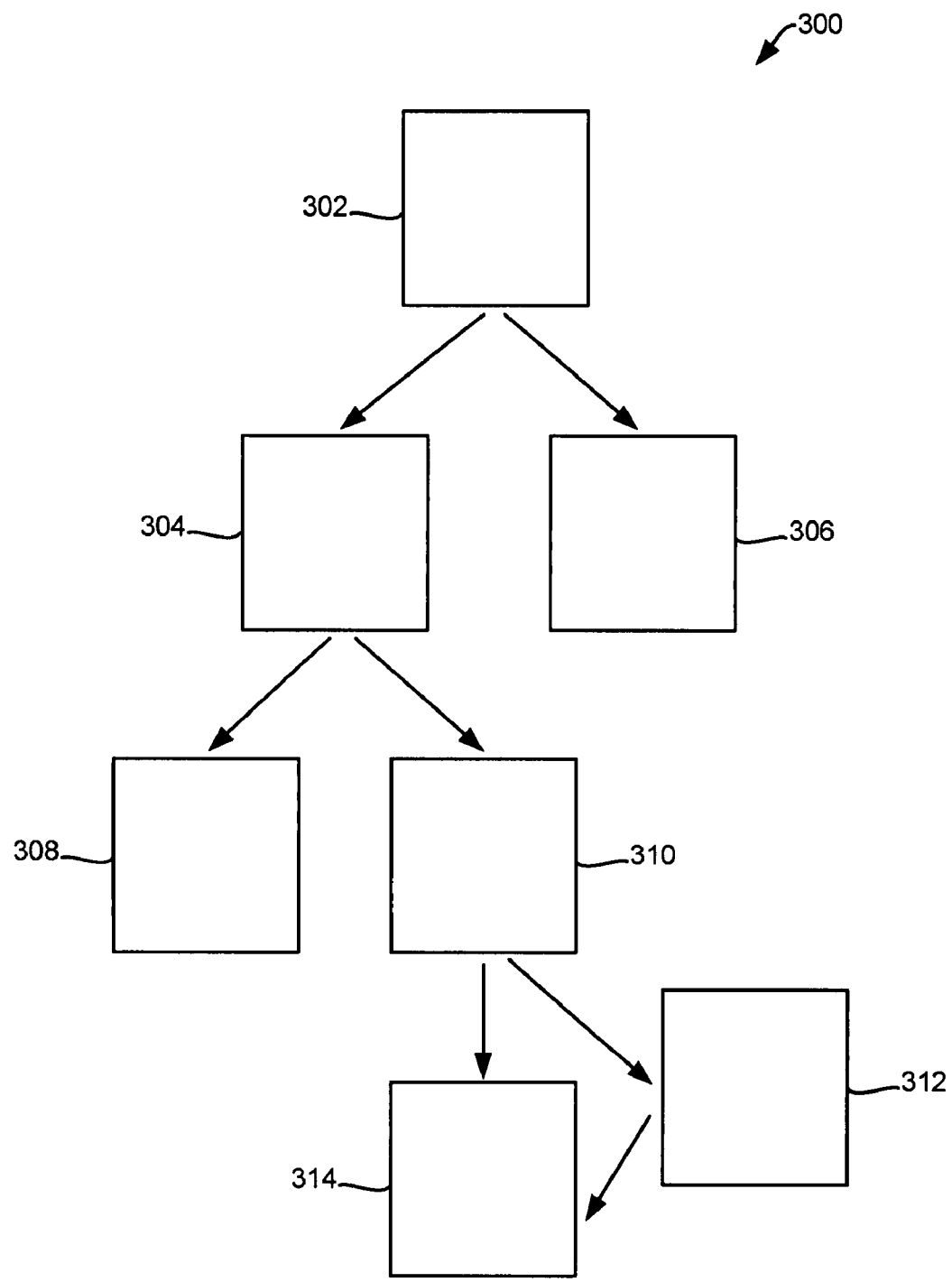
FIG. 3A shows a simplified control flow graph to facilitate discussion.
Figure 3B:
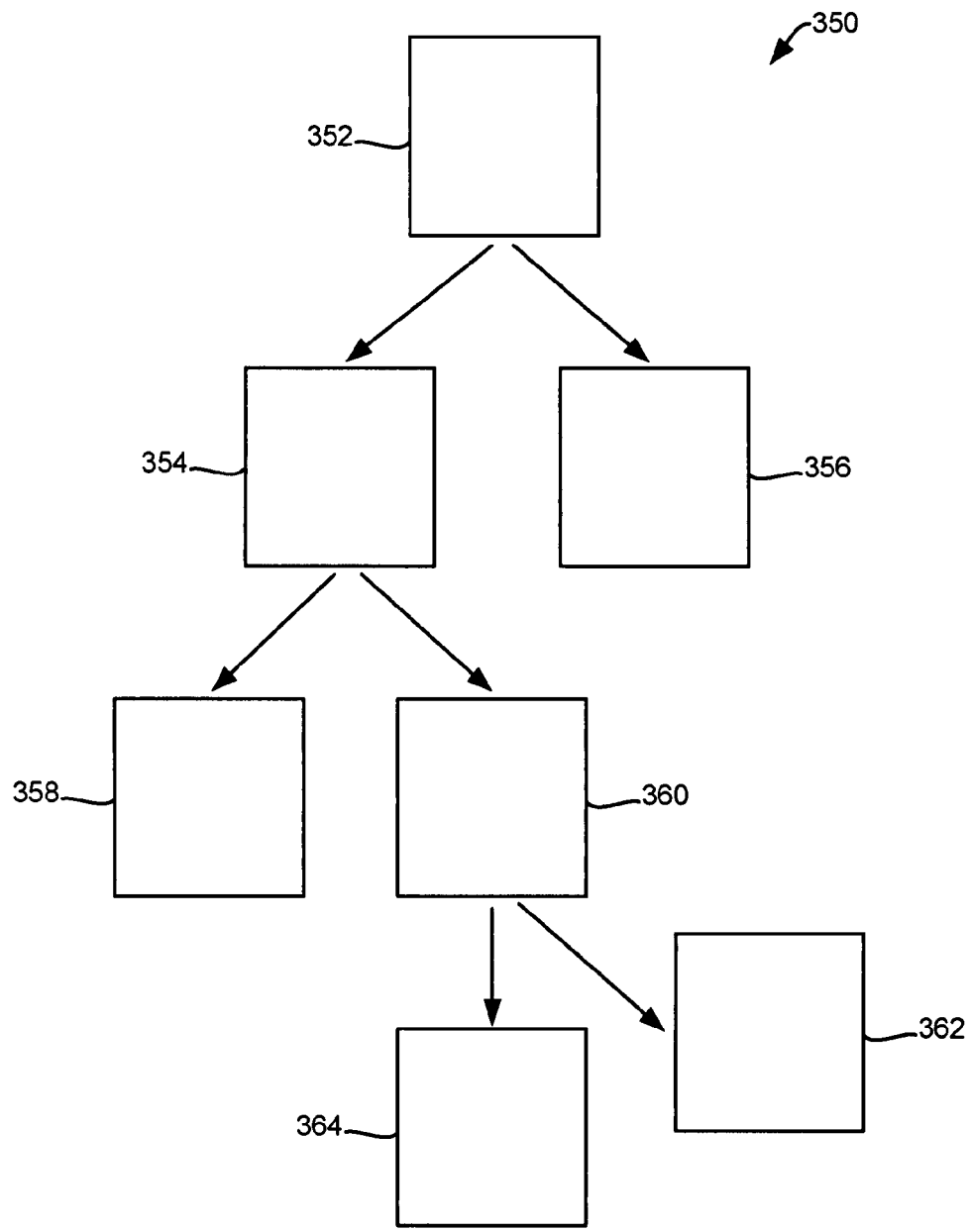
FIG. 3B shows the dominator tree corresponding to the control flow graph in FIG. 3A.
Figure 4:
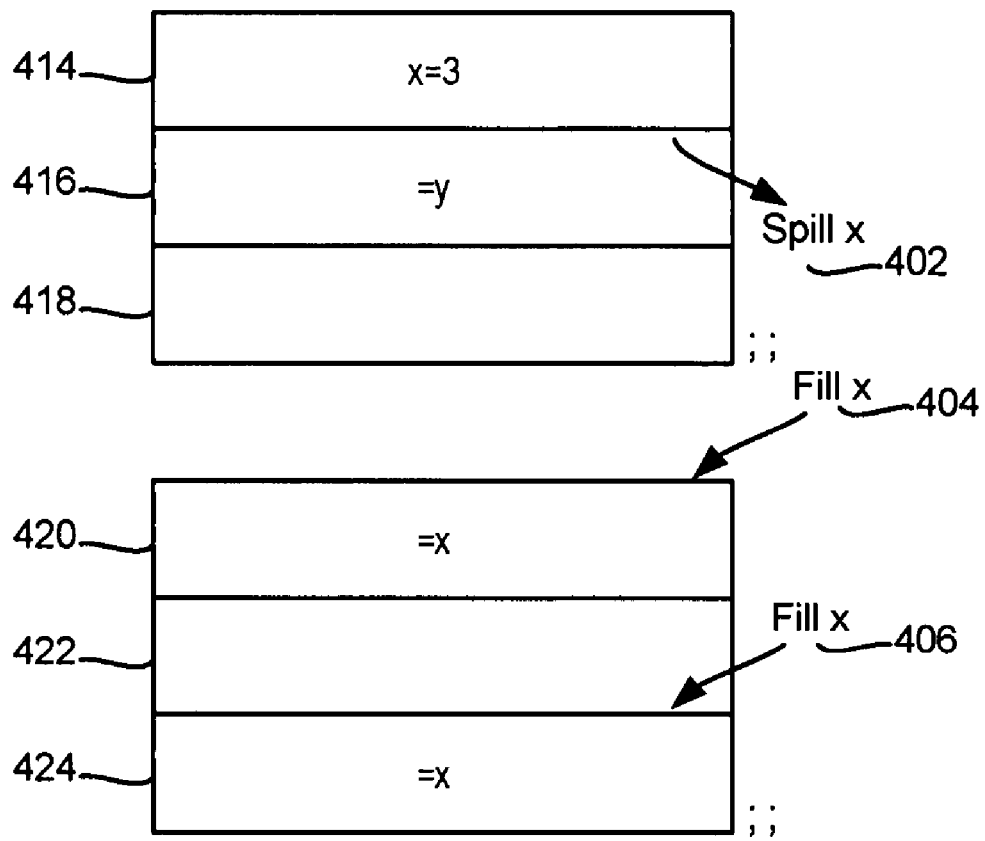
FIG. 4 shows a simplified schematic to illustrate how a register allocator may solve the high register pressure problem by performing spill-and-fill of a variable to and from memory.
Figure 5:
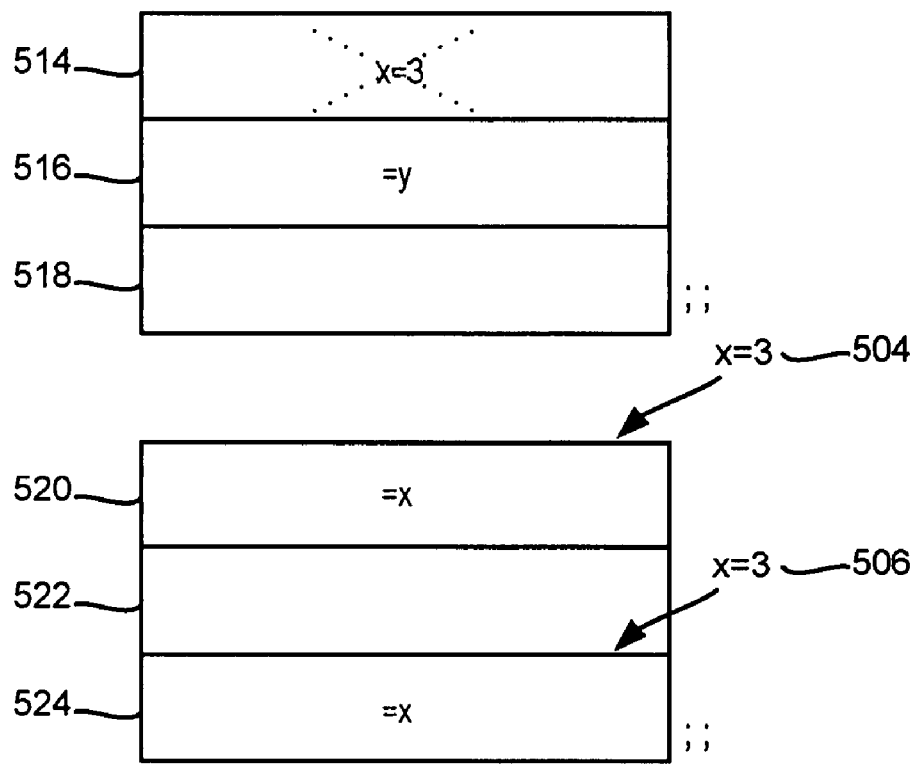
FIG. 5 shows a simplified schematic to illustrate the concept of rematerialization.

Consider the situation wherein, for example, there exists a region of the instruction stream where the register pressure may be high. Prematerialization may be used to reduce register pressure, before register allocation for variables occurs. FIG. 6A shows a prematerialization of variable x in an example where there may be a region of the instruction stream with high register pressure before prematerialization (as seen FIG. 2). The prematerialization of variable x may be performed to reduce register pressure. With reference to FIG. 2, the PM algorithm ascertains whether the definition of variable x 214 is suitable for prematerialization.

There are several types of definitions that may be suitable for prematerialization. In one type, a definition is suitable if the definition may be moved down the instruction stream without lengthening the live range of any other variable. For example, a suitable definition is given below by Reference 1:

$$x=sp+8 \qquad [\text{Reference 1}]$$

In Reference 1, x is set to the value of the variable sp plus a constant, 8. The variable sp is the stack pointer, and sp is live everywhere. Thus when the definition of x is moved down the instruction stream during prematerialization, the live range of variable sp will not be inadvertently lengthened since sp is live everywhere.

Another example of a suitable definition for prematerialization is given below by Reference 2:

$$x=8 \qquad [\text{Reference 2}]$$

In Reference 2, x is set to the constant value 8. There are no variables in the right-hand side of Reference 2. Moving the definition of x during prematerialization will not inadvertently lengthen the live range of any other variable.

If the right-hand side of a definition contains a variable that is not live everywhere, the live range of that variable may be affected by moving the definition. For example, an unsuitable definition may be given below by Reference 3:

$$x=y+8 \qquad [\text{Reference 3}]$$

If in Reference 3 the variable y is not live everywhere, and the definition of x is moved down during prematerialization, the live range of variable y may be inadvertently lengthened.

Consider the situation wherein the variables x and y in Reference 3 belong to different register classes. As an example, variable y may be an integer variable while variable x may be a floating point variable. A worthwhile opportunity may arise to trade off the lengths of the live ranges of these two variables, that is, to lengthen the live range of variable y and to shorten the live range of variable x.

Thus, the register pressure of a class of variables, e.g., integer variables, may be increased to reduce the register pressure of another class of variables, e.g., floating point variables. However, the trade-off between the two classes may be justified because of the net positive gain, e.g., there may be more registers available for allocating one class of variables than for the other.

Referring back to FIG. 2, the region between line 232 and line 234 may have high register pressure, i.e., greater than one in this example, where both variables x and y are live. The prematerialization of variable x may be performed to reduce the register pressure before register allocation, as may be seen in the implementation of FIG. 6A.

Consider the situation wherein, for example, the definition of variable x 214 of FIG. 2 is suitable for prematerialization in accordance with the aforementioned definition types in one embodiment. The PM algorithm looks for a use of variable x 220 and finds the closest appropriate nop instruction 218. Then the nop instruction 218 may be replaced with a definition of a new variant $x_1$ 618 and variable x in 220 may be replaced with variable $x_1$ in 620. An analogous transformation may be applied to variable x in 224, which is then seen in 624 (after transformation).

As the term is employed herein, an appropriate nop instruction is of an instruction type that is compatible with the original definition, and dominates the use at issue. Further, the appropriate nop instruction may need to be separated from the use by a number of cycle breaks necessary to satisfy the latency of the variant definition. Additionally, the appropriate nop may need to satisfy the constraint that the processor needs to have sufficient resources to execute the variant definition.

The PM algorithm may find an appropriate variant definition that is closer than the closest appropriate nop instruction. In this case, it does not need to create a new variant. As the term is employed herein, an appropriate variant definition is a definition of a variant of the same variable, which definition satisfies the same requirements as those for an appropriate nop, except that the issue of compatible instruction type does not come into play.

In the implementation of FIG. 6A, nop instruction 218 is assumed to be an appropriate nop as discussed above and as can be seen with reference to FIG. 2. The PM algorithm transforms the definition of x 214 by creating a new definition of $x_1$ in 618 as seen in FIG. 6A, where $x_1$ is a first variant of variable x. New definition of $x_1$ 618 replaces nop instruction 218. The original definition of x and the variant definition of $x_1$ are identical, in accordance with an embodiment of the invention.

After the transformation of nop instruction 218 to a variant definition of $x_1$ in 618 on behalf of the use of x 220, the use of x 220 may be rewritten with a new use of $x_1$ 620. The rewriting of x may be performed by taking the instruction that has a use of x, e.g., instruction 220, and replacing x with the first variant of variable x, $x_1$, as illustrated by the use of $x_1$ in 620 which matches up with the new definition of $x_1$ in 618.

The process may be repeated for the rewriting of each use of x. For example, the PM algorithm, on behalf of the use of x 224, starts at instruction 224 and scans up the instruction stream to find the nearest nop or definition of a variant of x. In this example, the scan finds the nearest appropriate nop instruction 222. In this case, the nop instruction 222 is not appropriate because there is no cycle break between the use of x 224 and nop instruction 222, i.e., latency is at least one in this example. In other examples, however, the latency requirement may be different. As the term is employed herein, latency is the minimum number of cycle breaks between the nop or variant definition and the use of a variable.

However, variant definition of $x_1$ in 618 is separated from use of x in 224 by cycle break 605 and therefore satisfies the latency requirement in this example (i.e., minimum of one cycle break). The PM algorithm is able to recognize the variant definition of $x_1$ in 618 as a variant of x and therefore may rewrite the use of x in 224 as $x_1$ in 624.

The PM algorithm looks for more uses of x. If there are no more uses of x and all the uses are covered by variant definitions, the original definition of variable x 214 is no longer useful. The PM algorithm then replaces the definition of x in 214 with a nop instruction in 614. Hence, the new nop instruction in 614 is now available for use in prematerialization of another variable.

With reference to FIG. 2, which is used in conjunction with FIG. 6A to discuss the prematerialization of x, the PM algorithm exploits explicit nop instructions to transform the definition of x 214 to a new definition of $x_1$ at instruction 618, rewrite the use of x 220 to the use of $x_1$ at instruction 620, rewrite the use of x 224 to the use of $x_1$ at instruction 624, and replace the unused definition of x 214 with a nop instruction 614.

As a result, prematerialization may be able to reduce register pressure by reducing the number of concurrent live variables. Register pressure may be determined by looking to see how many variables are live at each point in the instruction stream. In the implementation of FIG. 6A, only variables x and y are examined.

Referring to FIG. 2 to illustrate register pressure before PM of variable x, the instruction stream may be divided into three regions delineated by lines 230, 232, 234 and 236. The live variables are represented by live range of y 226 and live range of x 228. Between lines 230 and 232, the register pressure is one because there is only one live variable, y. Between lines 232 and 234, the register pressure is two because there are two live variables, x and y. Between lines 234 and 236, the register pressure is one because there is only one live variable, x.

Referring to FIG. 6A to illustrate register pressure after PM of variable x, the instruction steam may be divided into three regions delineated by lines 630, 632, 634 and 636 with two live ranges: a live range of y 626 and a live range of x 628. Between lines 630 and 632, the register pressure is one, and the live variable is y. Between lines 634 and 636, the register pressure is one, and the live variable is x. There is no register pressure greater than one in the instruction stream in the implementation of FIG. 6A. In this example, prematerialization of variable x eliminates the overlap of the live range of variable x with the live range of any other variable, i.e., the definition of x has been shifted down from instruction 614 to instruction 618 to prevent the overlap of the live range of variable x with the live range of variable y.

For a given variable suitable for prematerialization, the PM algorithm may perform either a full prematerialization or a partial prematerialization. In a full prematerialization of a variable, the algorithm is able to cover all uses of the variable with variant definitions of the variable and replaces the unused original definition with a nop instruction. In the case of partial prematerialization, the algorithm is able to cover some but not all uses of a given variable with variant definitions of that variable, and there is no replacement of the original definition with a nop instruction.

Figure 6B:
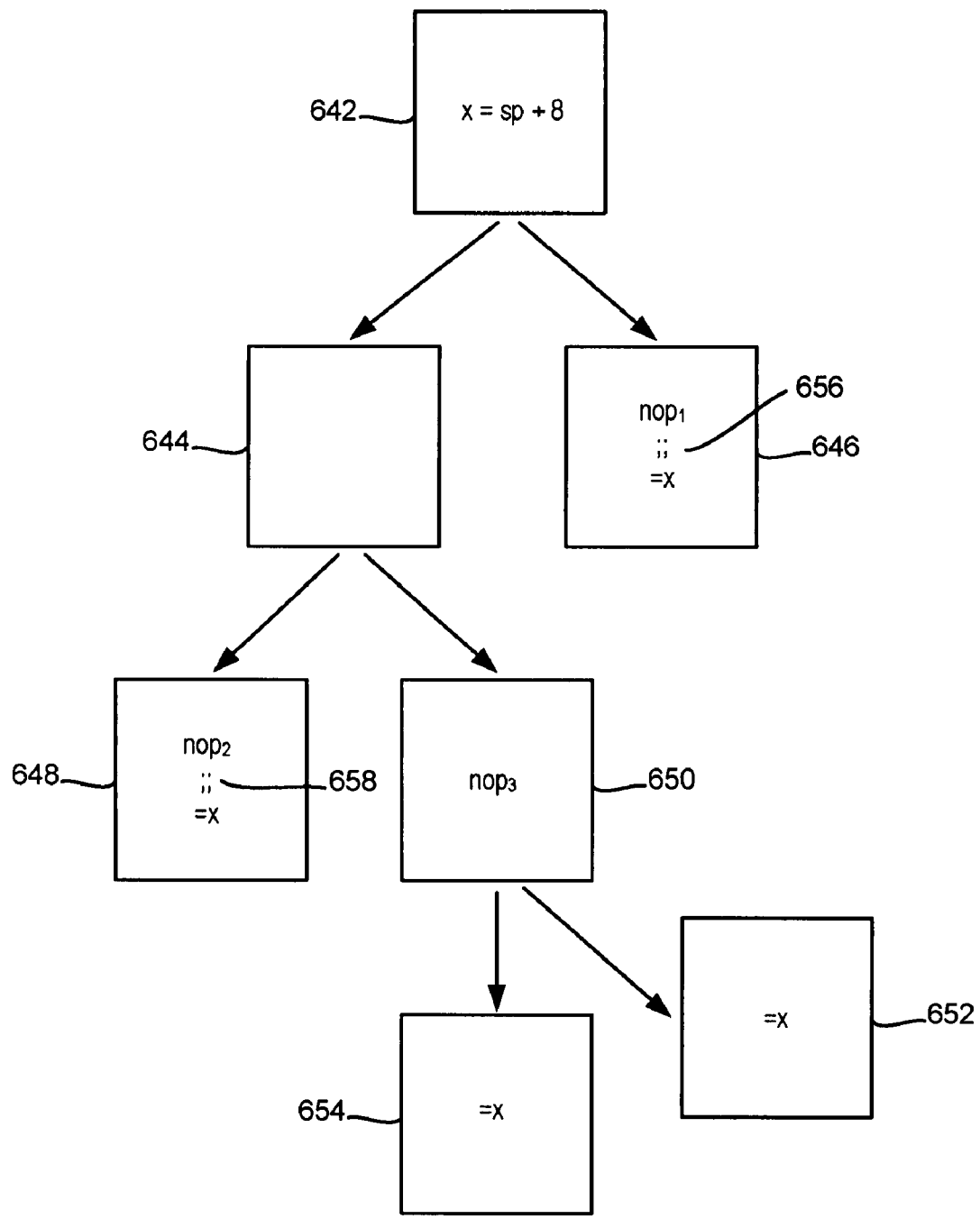
FIG. 6B shows, in accordance with another embodiment of the present invention, a simplified dominator tree before full prematerialization.

In the general case, a dominator tree may be employed to facilitate prematerialization. FIG. 6B shows, in accordance with another embodiment of the present invention, a simplified dominator tree before full prematerialization. The dominator tree of FIG. 6B shows dominator relationships among blocks 642, 644, 646, 648, 650, 652, and 654. Block 642 shows a definition of x, i.e., x=sp+8 where sp is the stack pointer. Blocks 646, 648, 652 and 654 show uses of x. Block 646 shows $nop_1$, a cycle break 656 and a use of x. Block 648 shows $nop_2$, a cycle break 658 and another use of x. Block 650 shows $nop_3$.

Figure 6C:
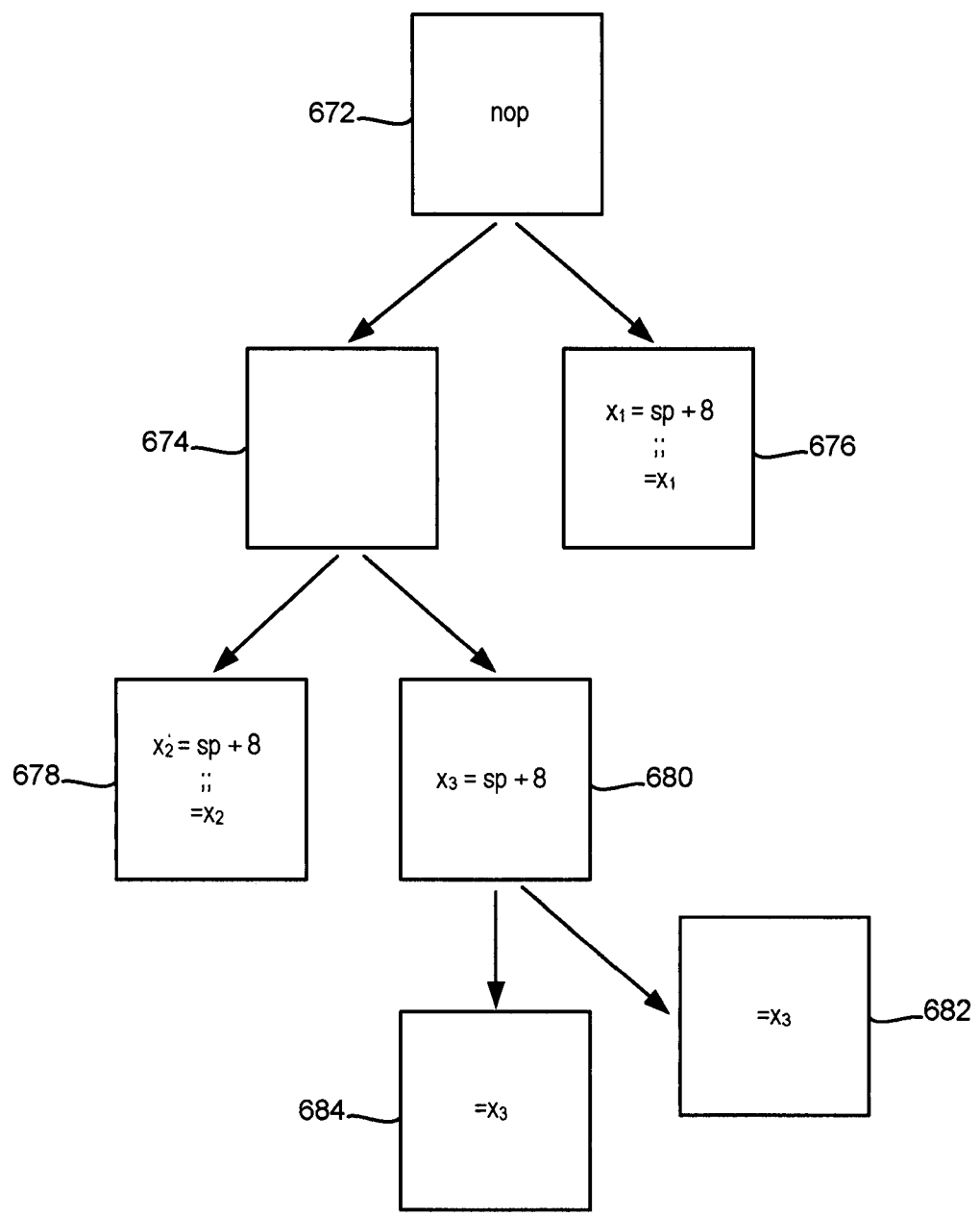
FIG. 6C shows, in accordance with an embodiment of the present invention, a simplified dominator tree after full prematerialization.

FIG. 6C shows, in accordance with an embodiment of the present invention, a simplified dominator tree (having blocks 672, 674, 676, 678, 680, 682, and 684) after full prematerialization. FIG. 6B is used in relation to FIG. 6C to illustrate the dominator trees before and after full prematerialization, respectively.

Consider the situation wherein, for example, the variable x is suitable for prematerialization in the implementation of FIG. 6B. The PM algorithm starts at a use of x, in block 646, and scans upward, looking for either an appropriate nop instruction or an appropriate definition of a variant of x. In this example, the scan finds a nop instruction, $nop_1$ also in block 646. This nop instruction, $nop_1$ in block 646, turns out to be an appropriate nop instruction.

In an embodiment, a definition for the first variant of x, $x_1$=sp+8, is created by replacing $nop_1$ in block 646 with a copy of definition of x from block 642. Block 676 of FIG. 6C shows a variant definition of x, $x_1$, in place of $nop_1$. After the creation of $x_1$ on behalf of the use of x in block 646, this use of variable x is rewritten as a use of the first variant of variable x, $x_1$, in block 676 of FIG. 6C.

The process is repeated for the next use of x. In the implementation of FIGS. 6B and 6C, the next use of x is seen in block 648. A scan upwards finds an appropriate $nop_2$ in block 648. In this case, $nop_2$ is replaced with a definition for the second variant of x, $x_2$=sp+8, and the use of variable x is rewritten as a use of the second variant of variable x, $x_2$, in block 678.

For the next use of x in block 652, no appropriate nop instruction or variant definition is found in block 652. The PM algorithm goes up the dominator tree and finds an appropriate nop instruction, $nop_3$ in block 650. In this case, $nop_3$ is replaced with a definition for the third variant of x, $x_3$=sp+8, in block 680. The use of x is rewritten as a use of the third variant of variable x, $x_3$, in block 682.

For the last use of x in block 654, no appropriate nop instruction or variant definition is found in block 654. The PM algorithm goes up the dominator tree and finds an appropriate variant definition of x in block 680. The PM algorithm replaces the use of x with a use of the third variant of variable x, $x_3$ in block 684.

In full prematerialization, all the uses of x are covered with variant definitions of x. The original definition of x in block 642 of FIG. 6B is unused. The unused original definition of x may be replaced with a nop instruction, as seen in block 672. As can be seen, a new nop instruction replaces the original definition of a variable that is fully prematerialized. The new nop instruction becomes available for prematerialization of other variables.

Figure 7A:
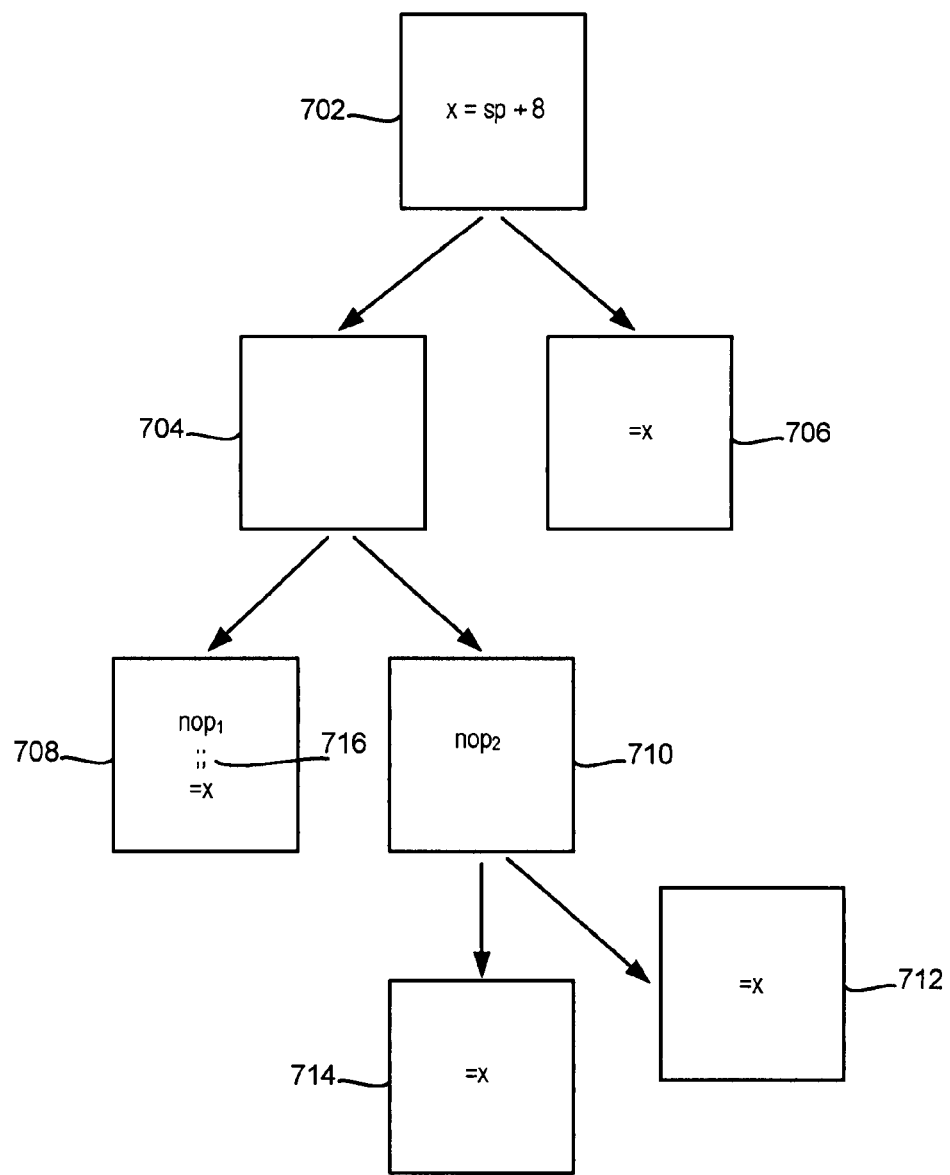
FIG. 7A shows, in accordance with an embodiment of the present invention, a simplified dominator tree before partial prematerialization.

FIG. 7A shows, in accordance with an embodiment of the present invention, a simplified dominator tree (having blocks 702, 704, 706, 708, 710, 712, and 714) before partial prematerialization. Block 702 shows a definition of x. Blocks 706, 708, 712, and 714 show uses of x. Block 708 shows $nop_1$, a cycle break 716 and a use of x. Block 710 shows $nop_2$.

Figure 7B:
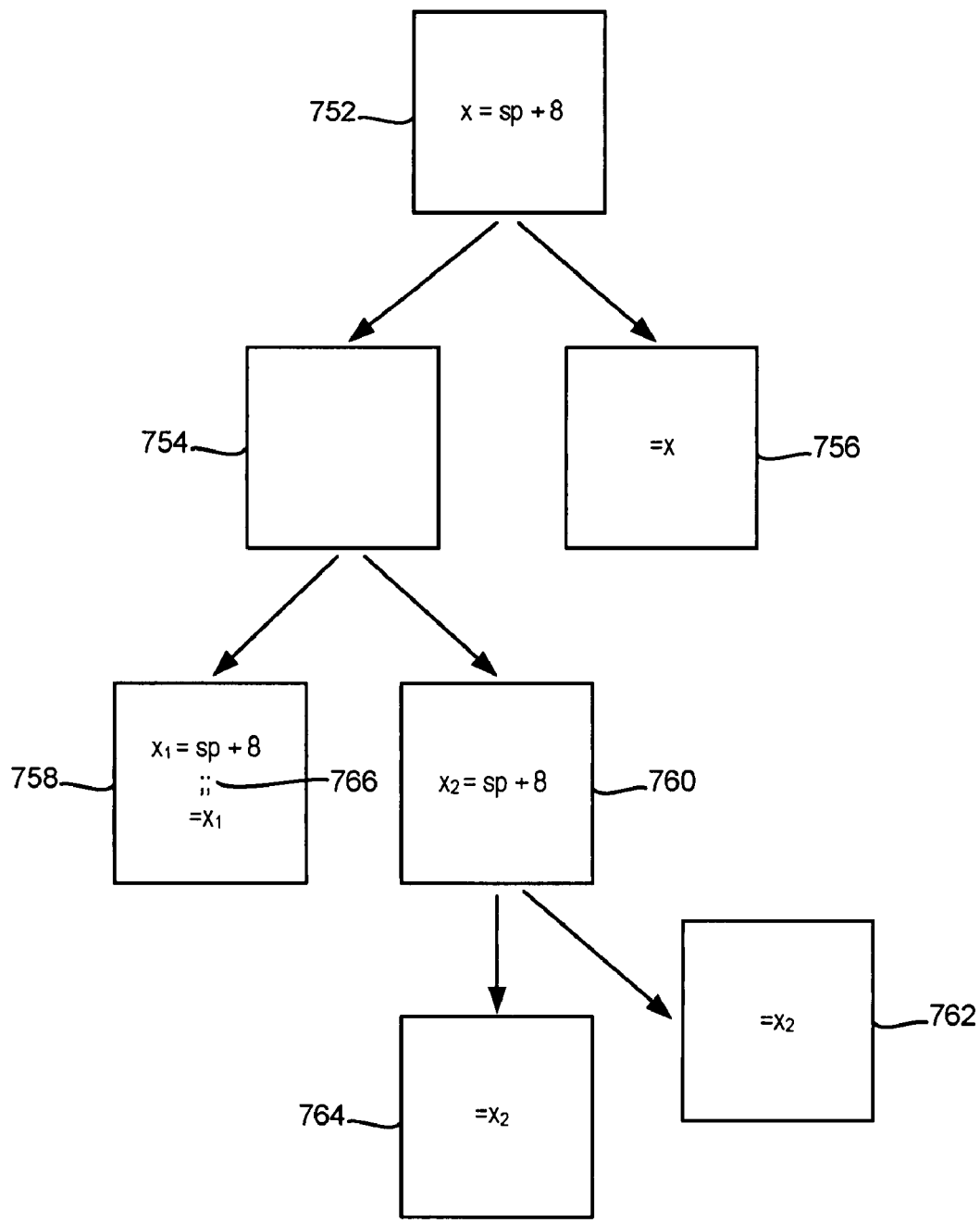
FIG. 7B shows, in accordance with an embodiment of the present invention, a simplified dominator tree after partial prematerialization.

FIG. 7B shows, in accordance with an embodiment of the present invention, a simplified dominator tree (having blocks 752, 754, 756, 758, 760, 762, and 764) after partial prematerialization. FIG. 7A is used in relation to FIG. 7B to illustrate the dominator trees before and after partial prematerialization, respectively.

Consider the situation wherein, for example, the variable x is suitable for prematerialization in the implementation of FIG. 7A The PM algorithm starts at a use of x, in block 706, and scans upward, looking for either an appropriate nop instruction or an appropriate definition of a variant of x.

In an embodiment, the PM algorithm is not able to find an appropriate nop or an appropriate variant definition to cover the use in block 706. Therefore, the use of x in block 706 of FIG. 7A is not replaced in block 756 of FIG. 7B. Because the use of x is not covered, as mentioned above with reference to block 706, the original definition of x in block 702 of FIG. 7A is retained in block 752 of FIG. 7B.

The next use of x is illustrated in block 708. The PM algorithm scans upwards and finds appropriate $nop_1$, also in block 708. In this case, $nop_1$ in block 708 is replaced with a definition for the first variant of x, $x_1$=sp+8, in block 758. The use of x in block 708 is rewritten as a use of the first variant of variable x, $x_1$, in block 758.

For the next use of x in block 712, no appropriate nop instruction or variant definition is found in block 712. The PM algorithm goes up the dominator tree and finds an appropriate nop instruction, $nop_2$ in block 710 above. In this case, $nop_2$ is replaced with a definition for the second variant of x, $x_2$=sp+8, in block 760. The use of x is rewritten as a use of the second variant of variable x, $x_2$ in block 762.

For the last use of x in block 714, no appropriate nop instruction or variant definition is found in block 714. The PM algorithm goes up the dominator tree and finds an appropriate variant definition of x, $x_2$ in block 760. The PM algorithm replaces the use of x in block 714 with a use of the second variant of variable x, $x_2$, in block 764.

In partial prematerialization, some uses of x, for example the use of x in block 756, are not covered by the variant definitions of x because an appropriate nop or appropriate variant definition is not available. The original definition of x is retained to cover these uses of x. For example, the definition of x in block 752 is not replaced with a nop nor is the use of x in block 756 rewritten. Although partial PM is not able to generate a new nop instruction, partial PM is able to replace a complicated live range with simpler live ranges to reduce register pressure.

Consider the situation wherein, for example, a plurality of suitable variables may exist in an instruction stream for prematerialization. The PM algorithm may assign each suitable variable a priority value. The priority value determines the order in which the PM algorithm may attempt to transform the variable live range.

In PM, the variant definitions are distributed among a finite set of explicit nop instructions. This set consists of those nops present in the instruction stream prior to PM together with those created in the instruction stream by full prematerialization, as previously described. The function for producing a priority value for a variable should favor (i.e., grant priority to) variables that are likely to need the fewest number of variant definitions (and therefore are likely to consume the fewest nop instructions during PM, leaving more nop instructions for other variables) and should favor variables that are likely to be fully prematerialized (and therefore are likely to create new nops during PM that may be used for other variables). These two factors may be taken into account in various ways, and different tradeoffs would produce different results.

Figure 8:
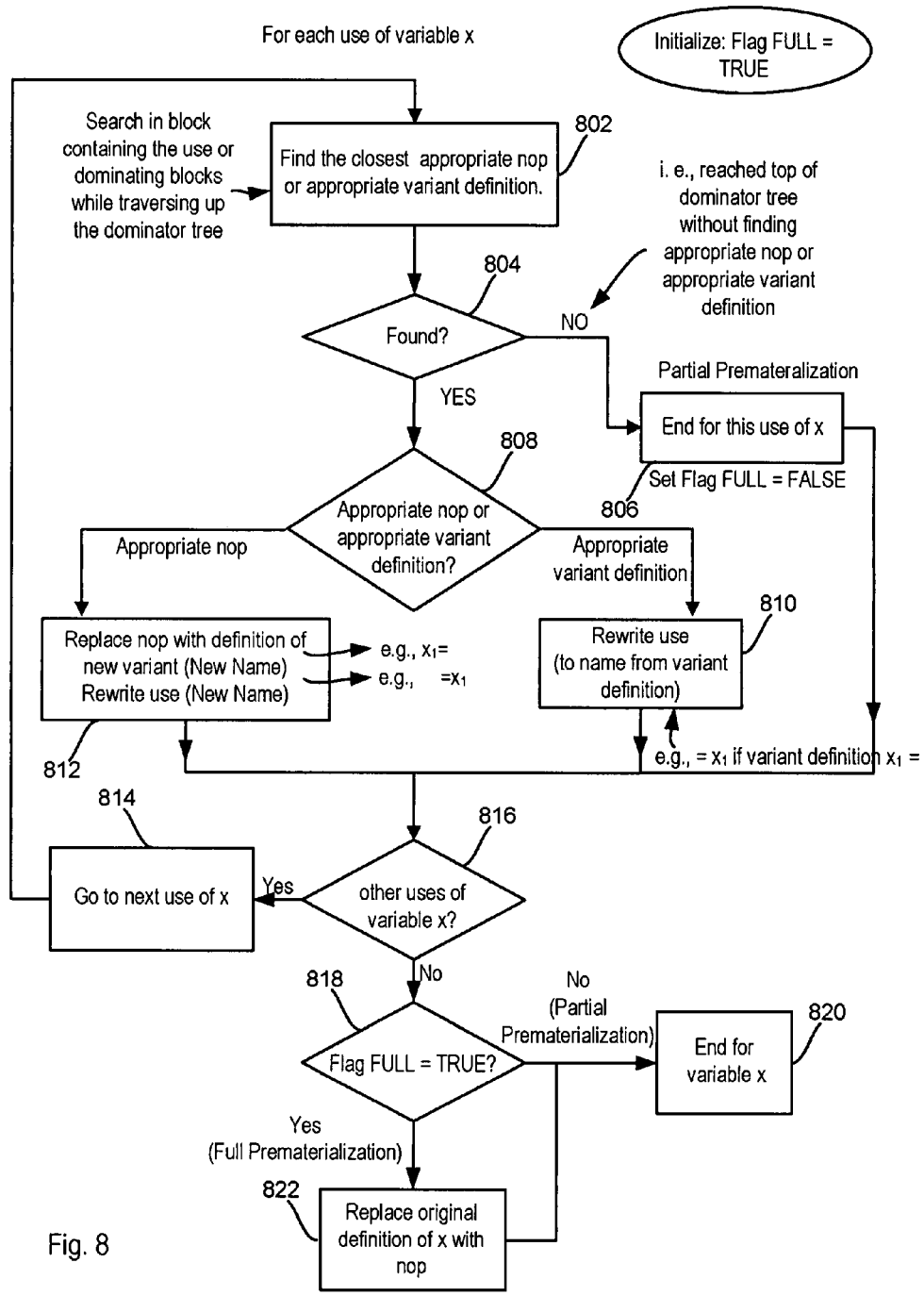
FIG. 8 shows, in accordance with an embodiment of the invention, a flow chart of the steps in prematerialization for each use of a suitable variable.

FIG. 8 shows, in accordance with an embodiment of the invention, a flow chart of the steps in prematerialization for each use of a suitable variable. Consider the situation wherein, for example, the PM algorithm starts with the most favored variable among a plurality of suitable variables. For each variable, the flag FULL signifying full prematerialization is set to TRUE initially.

On behalf of a use of a variable x, step 802 searches in the block containing the use or dominating blocks by traversing up the dominator tree to find the closest appropriate nop or appropriate variant definition. In step 804, if the PM algorithm reaches the top of the dominator tree without finding an appropriate nop or appropriate variant definition, then the PM algorithm finishes the analysis for that use of x (step 806). In step 806, the flag FULL is set to FALSE and the prematerialization is partial. The PM algorithm proceeds to step 816 to find other uses of x.

In step 804, if the PM algorithm finds either an appropriate nop or an appropriate variant definition, the PM algorithm proceeds to step 808. If the result is an appropriate nop, the PM algorithm proceeds to step 812, else it proceeds to step 810 if the result is an appropriate variant definition. In step 812, the PM algorithm replaces the nop instruction with a definition of a new variant and rewrites the use by employing this variant. Alternatively for step 810, the PM algorithm rewrites the use to the name of the existing variant.

The PM algorithm proceeds to step 816 to ascertain whether there are other uses of variable x. If the result is positive, the PM algorithm continues to step 814 to process the next use of x. The PM algorithm returns to step 802 to process this next use of x.

If the result of step 816 is negative, the PM algorithm checks to see whether the value of flag FULL is TRUE in step 818. If not, the PM is partial and the PM algorithm proceeds to step 820 to end processing for variable x. If the value of flag FULL is TRUE, the PM is full and the PM algorithm proceeds to step 822 to replace the original definition of x with a nop instruction.

As may be appreciated from the foregoing, embodiments of the invention reduce register pressure through prematerialization by taking advantage of available explicit nop instructions to create more useful instructions without increasing the total number of instructions.

In contrast to the prior art approach of spill-and-fill, the inventive PM algorithm does not introduce the overhead associated with fill-and-spill memory operations. Compared to the prior art rematerialization technique, the inventive PM algorithm does not insert a definition of a variable immediately prior to each use of the variable.

Advantageously, prematerialization is able to reduce the register pressure in an instruction stream prior to register allocation. Note that prematerialization, when practiced in accordance with embodiments of the invention, is able to reduce register pressure without insertion of new instructions. Prematerialization is able to take advantage of explicit nop instructions by replacing them with definitions of variants of the variables being prematerialized. Further, prematerialization is able to create new explicit nop instructions from definitions that have been rendered unused through complete prematerialization and makes the new nop instructions available for prematerialization of other variables.

While this invention has been described in terms of several preferred embodiments, there are alterations, permutations, and equivalents, which fall within the scope of this invention. For example, for any single use of a variable to be prematerialized in the above examples, a search for a single appropriate nop or variant definition to cover that use is undertaken. It should be noted, however, that it is possible for an implementation to search instead for an appropriate set of nops and variant definitions to cover that use. As the term is employed herein, an appropriate set is one in which each member nop and variant definition is appropriate except that instead of each instruction dominating the use the instructions in the set collectively dominate the use; and furthermore, every variant definition in the set defines the same variant.

If there is at least one nop in the set, a variant definition is created for each nop, and each definition will define the same variant. If there is at least one variant definition in the set, then any variant definitions created will define the existing variant; otherwise, they will define a single new variant. The decision pertaining to the use of an appropriate set instead of a single appropriate instruction is implementation-specific.

In the above examples, an appropriate nop for a given use is required to be of an instruction type compatible with that of the original definition of the variable at issue. It should be noted, however, that it may be possible for an implementation to reorganize the instructions within the bundle containing a nop or even the instructions within some sequence of adjacent instruction bundles including the one containing a nop to create a nop of compatible type in place of a nop of incompatible type. This may allow the use of more and/or closer nops at the cost of increased implementation complexity.

In the above discussion, once a definition of a variant is created in place of a nop, the definition has been placed in its final location in the instruction stream. When PM scans the instruction stream looking for an appropriate nop or variant definition to cover a given use, it may find a variant definition that is appropriate except that it is not separated from the use by a sufficient number of cycle breaks. It should be noted that it is possible for an implementation to consider moving this variant definition to a dominating nop (putting a nop in its current position) in order to satisfy the latency requirements of the given use. The implementation will need to consider whether lengthening the span from this variant definition to the uses it already covered is worth the benefit of not needing to create a new variant definition for the given use.

In the above discussion, a single pass of prematerialization is performed over the set of variables suitable for prematerialization. It should be noted, however, that an implementation may make multiple passes, with each pass processing some appropriate subset of the variables suitable for prematerialization. As a first example, after performing a complete pass over all variables during which at least one variable underwent full or partial prematerialization, there may be some variables that have not yet been fully prematerialized. However, the prematerializations that did occur may have created new nops that were not available to the variables that were processed before those nops were created. Consequently, it may be advantageous to make one or more additional complete passes over those variables. As a second example, it may be advantageous to allow partial prematerialization only after all possible full prematerializations have taken place. Many other methods of organizing prematerialization into multiple passes are also possible.

In the above discussion, the priority for variables is determined by considering the number of variant definitions a variable is likely to require and the likelihood that a variable may be fully prematerialized. It should be noted, however, that it is possible to incorporate many other factors into the prioritization. As a first example, it may be advantageous, in some cases, to favor variables of certain register classes over variables of certain other register classes. As a second example, it may be advantageous, in some cases, to favor variables that are live in regions of the highest register pressure. As a third example, it may be advantageous, in some cases, to favor variables that are accessed in regions of highest execution frequency.

Accordingly, these and other permutations and implementations are contemplated within the spirit of the disclosure presented. Further, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A computer-implemented method for optimizing a code section that includes a plurality of instructions, said optimizing being performed prior to performing register allocation for variables referenced in said plurality of instructions, comprising:

ascertaining a definition of a variable in a first instruction of said plurality of instructions;

ascertaining a first use of said variable in a second instruction of said plurality of instructions, said first instruction dominating said second instruction in said plurality of instructions;

replacing a first nop instruction in a third instruction of said plurality of instructions with a definition of a first variant of said variable, said definition of said first variant of said variable and said definition of said variable are identical, said third instruction dominates said second instruction in said plurality of instructions, said first instruction dominates said third instruction in said plurality of instructions; and replacing, in said second instruction, said variable in said first use of said variable with said first variant of said variable.

2. The method of claim 1 further comprising replacing said definition of said variable in said first instruction with a second nop instruction.

3. The method of claim 1 wherein said first nop instruction represents a nop instruction that is closest to said second instruction in said plurality of instructions.

4. The method of claim 3 wherein said first nop instruction is required to be separated from said second instruction by a predefined minimum number of one or more instruction cycle breaks.

5. The method of claim 4 further comprising:

ascertaining a second use of said variable in a fourth instruction of said plurality of instructions, said second instruction dominates said fourth instruction in said plurality of instructions; and replacing, in said fourth instruction, said variable in said second use of said variable with said first variant of said variable.

6. The method of claim 5 wherein said fourth instruction is required to be separated from said second instruction by a predefined minimum number of one or more instruction cycle breaks.

7. An article of manufacture embodying a computer-readable medium for optimizing a code section that includes a plurality of instructions, said optimizing being performed prior to performing register allocation for variables referenced in said plurality of instructions, comprising:

computer readable code for ascertaining a definition of a variable in a first instruction of said plurality of instructions;

computer readable code for ascertaining a first use of said variable in a second instruction of said plurality of instructions, said first instruction dominates said second instruction in said plurality of instructions;

computer readable code for replacing a first nop instruction in a third instruction of said plurality of instructions with a definition of a first variant of said variable, said definition of said first variant of said variable and said definition of said variable are identical, said third instruction dominates said second instruction in said plurality of instructions, said first instruction dominates said third instruction in said plurality of instructions; and computer readable code for replacing, in said second instruction, said variable in said first use of said variable with said first variant of said variable.

8. The article of manufacture of claim 7 further comprising computer readable code for replacing said definition of said variable in said first instruction with a second nop instruction.

9. The article of manufacture of claim 7 wherein said first nop instruction represents a nop instruction that is closest to said second instruction in said plurality of instructions.

10. The article of manufacture of claim 9 wherein said first nop instruction is required to be separated from said second instruction by a predefined minimum number of one or more instruction cycle breaks.

11. The article of manufacture of claim 7 further comprising:

computer readable code for ascertaining a second use of said variable in a fourth instruction of said plurality of instructions, said second instruction dominates said fourth instruction in said plurality of instructions; and computer readable code for replacing, in said fourth instruction, said variable in said second use of said variable with said first variant of said variable.

12. The article of manufacture of claim 11 wherein said fourth instruction is required to be separated from said second instruction by a predefined minimum number of one or more instruction cycle breaks.

13. A computer-implemented method for optimizing a code section that includes a plurality of computer instructions, comprising:

performing at least one of a full prematerialization or a partial prematerialization for a variable in said plurality of computer instructions, said full prematerialization replacing one or more nop instructions in said plurality of computer instructions with one or more definitions of one or more variants of said variable, replacing said variable in every use of said variable in said plurality of computer instructions with said one or more variants of said variable, and replacing a definition of said variable with a nop instruction, and said partial prematerialization replacing one or more nop instructions in said plurality of computer instructions with one or more definitions of one or more variants of said variable, and replacing some but not all occurrences of said variable in uses of said variable in said plurality of computer instructions with said one or more variants of said variable without replacing said definition of said variable with said nop instruction, wherein said performing said at least one of said full prematerialization and said partial prematerialization is performed prior to performing register allocation for variables referenced in said plurality of computer instructions.

14. The method of claim 13 wherein said optimizing represents said full prematerialization.

15. The method of claim 13 wherein said optimizing represents said partial prematerialization.

16. An article of manufacture embodying a computer-readable medium for optimizing a code section that includes a plurality of computer instructions, comprising:

computer readable code for performing at least one of a full prematerialization and a partial prematerialization for a variable in said plurality of computer instructions, said full prematerialization replacing one or more nop instructions in said plurality of computer instructions with one or more definitions of one or more variants of said variable, replacing said variable in every use of said variable in said plurality of computer instructions with one or more variants of said variable, and replacing a definition of said variable with a nop instruction, and said partial prematerialization replacing one or more nop instructions in said plurality of instructions with one or more definitions of one or more variants of said variable, and replacing some but not all occurrences of said variable in uses of said variable in said plurality of computer instructions with said one or more variants of said variable without replacing said definition of said variable with said nop instruction, wherein said performing said at least one of said full prematerialization and said partial prematerialization is performed prior to performing register allocation for variables referenced in said plurality of computer instructions.

17. The article of manufacture of claim 16 wherein said optimizing represents said full prematerialization.

18. The article of manufacture of claim 16 wherein said optimizing represents said partial prematerialization.

* * * * *